June 23, 1953 — H. T. HUNTER ET AL — 2,642,860
DOUGH CONDITIONING APPARATUS
Filed Nov. 17, 1950 — 2 Sheets—Sheet 1
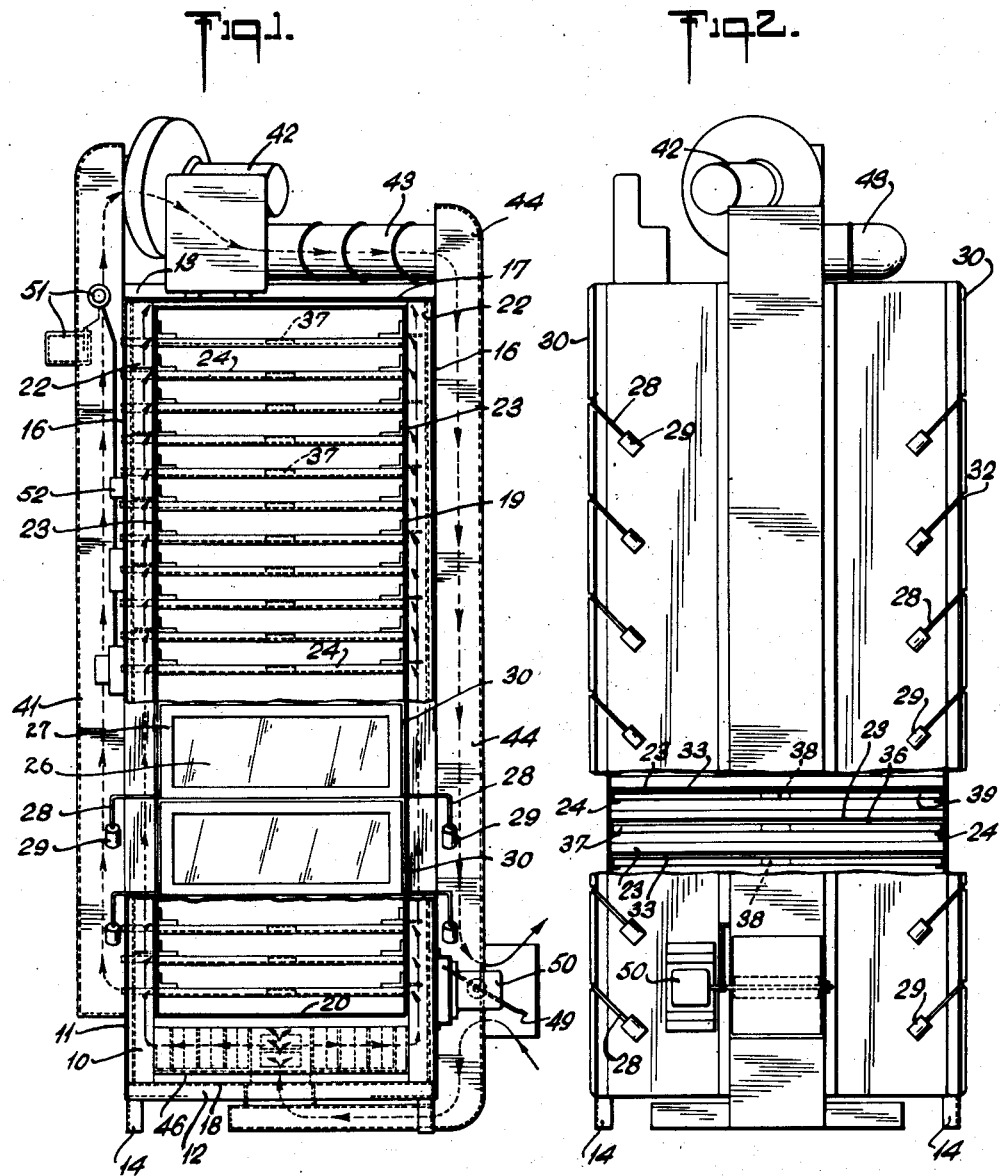
INVENTORS.
HERBERT T. HUNTER and
BEN W. WILSON
BY
William R. Lieberman
ATTORNEY

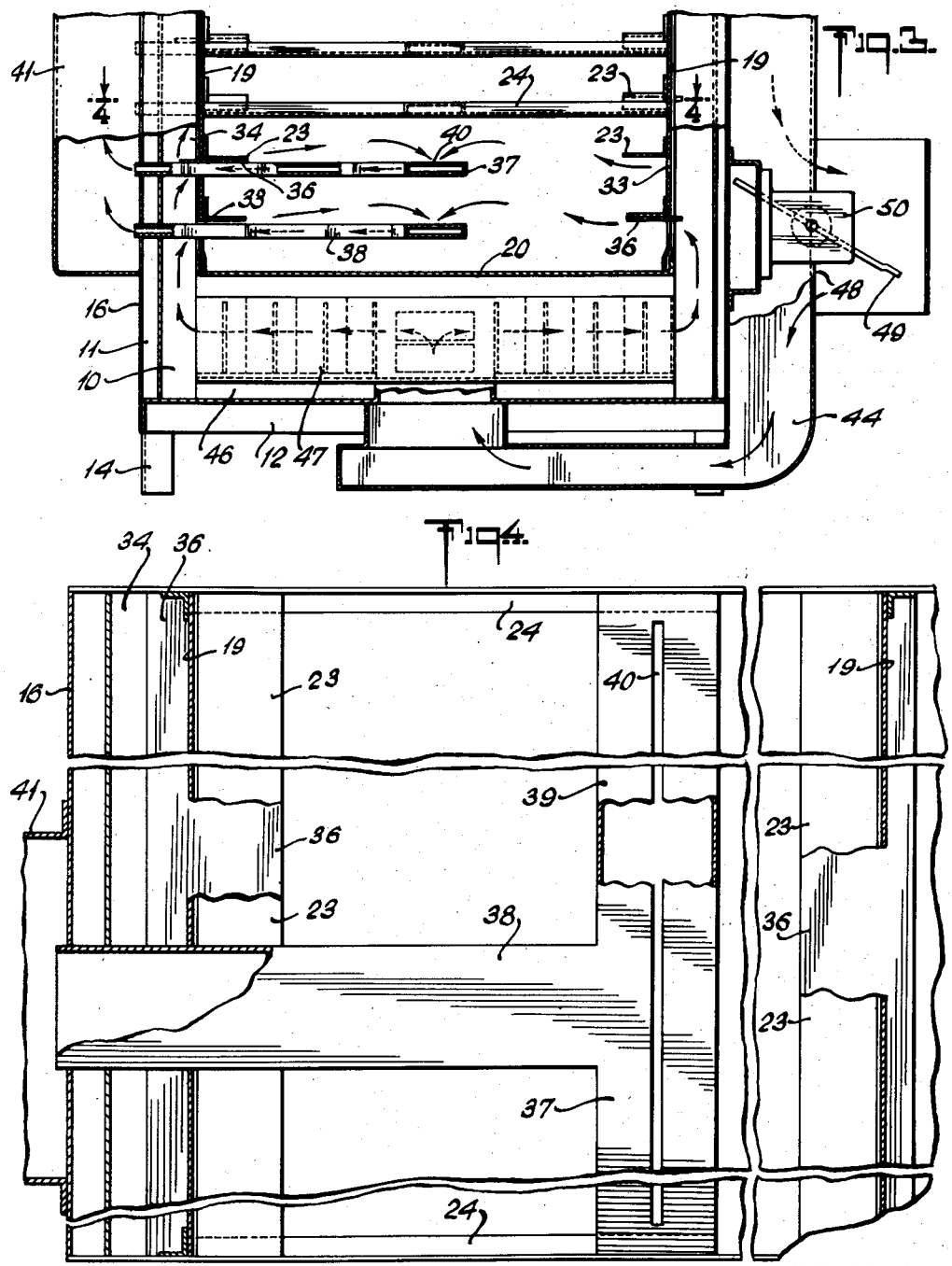

Patented June 23, 1953

2,642,860

UNITED STATES PATENT OFFICE 2,642,860

DOUGH CONDITIONING APPARATUS

Herbert T. Hunter, Baltimore, Md., and Ben W. Wilson, Manhasset, N. Y., assignors to Doughnut Corporation of America, New York, N. Y., a corporation of New York Application November 17, 1950, Serial No. 196,114

9 Claims. (Cl. 126—281)

1

The present invention relates to an improved conditioning cabinet and it relates more particularly to an improved proofing cabinet employed for the raising of yeasted dough in the production of doughnuts, cakes, crullers, rolls, bread and the like.

Proofing cabinets for such purposes are widely employed in the baking industry in order to maintain desirable ambient conditions of temperature and humidity in connection with the raising of the dough. In order to produce bakery products made of yeast raised dough, such as doughnuts, cakes, crullers, rolls, bread or the like of uniform quality, it is necessary that each of the products be subjected to identical processing steps, one of which is that of raising the dough. Therefore, the ambient temperature and humidity conditions surrounding the raising of the dough as well as the dough raising interval should be the same for each of the articles in order to insure uniformity of product. Furthermore, close and uniform control of the atmosphere surrounding the raising of the dough permits closely planned production schedules and realization of economies generally consequent thereto. There have been many attempts to provide proofing cabinets satisfying the aforesaid requirements, but these have failed to achieve their purposes. Their principal drawback is their inability to maintain uniform temperature and humidity condition throughout the cabinet, particularly where large cabinets are employed.

It is, therefore, a principal object of the present invention to provide an improved proofing cabinet for use in the raising of yeasted dough in the production of doughnuts, cakes, crullers, bread, rolls and the like.

Another object of the present invention is to provide an improved proofing cabinet capable of maintaining uniform ambient temperature and humidity conditions throughout the cabinet.

Still another object of the present invention is to provide an improved proofing cabinet which allows access to portions thereof without disturbing the ambient temperature and humidity conditions in other portions of the proofing cabinet, thereby permitting loading and unloading of separate sections of the cabinet.

A further object of the present invention is to provide an improved proofing cabinet permitting close temperature and humidity control uniformly throughout the cabinet and substantially independent of the degree of proofing of the dough and characterized by its rugged construction, low maintenance and long life.

2

The above and other objects of the present invention will become apparent from a reading of the following description taken in conjunction with the accompanying drawings, wherein Figure 1 is a front sectional view of the improved proofing cabinet;

Figure 2 is a side elevational view thereof shown partially broken away;

Figure 3 is a detailed front sectional view of the lower portion of the cabinet; and Figure 4 is a sectional view taken along line 4—4 of Figure 3.

The main objects of the present invention are achieved principally by a novel arrangement of the air circulating ducts and manifolds which insure uniform temperature and humidity conditions throughout the proofing cabinet.

The present invention contemplates the provision of a proofing cabinet having a manifold communicating with the interior of the cabinet at a side thereof and through a plurality of vertically spaced ports, and a second manifold communicating with the interior of the cabinet through vertically spaced ports located between opposite walls of the cabinet. Air circulating means are connected between the two manifolds whereby to circulate the air into one of the manifolds through the proofing cabinet by way of the ports and out of the other manifold. During circulation, the air is subjected to regulated heating to maintain the desired temperature and regulated mixing with the room air to maintain the desired humidity conditions.

In its more limited aspect, the present invention contemplates the provision of a proofing cabinet having hollow side walls which define manifolds, the walls having a plurality of vertically spaced horizontal slits formed therein providing communication between the manifold and the interior of the chamber. A plurality of horizontal, vertically spaced substantially flat ducts are provided which project into the interior of the chamber and are provided with transverse slits affording communication between the cabinet interior and the ducts, the other ends of the ducts being connected to a common exhaust manifold. The wall manifolds and the exhaust manifold are connected by conduits through air circulating means, humidity control and air heating means.

Reference is now made to the drawings illustrating a preferred embodiment of the present invention, wherein the supporting framework of the proofing cabinet is designated by reference numeral 10, said framework including vertical structural members 11 at the vertical edges of the cabinet, lower transverse and lateral structural members 12 and upper transverse and lateral structural members 13. The structural members are suitably joined by welding or other means to form a rigid supporting framework which is mounted on legs 14. Rectangular panels 16 of sheet metal or the like are supported by the vertical frame members 11 and constitute the outer side walls of the proofing cabinet. Rectangular panel 17, supported on the upper frame members 13, constitutes the top wall of the cabinet, and a rectangular panel within structural members 12 constitutes the bottom wall of the cabinet. Furthermore, a pair of vertical side panels 19 are suitably supported within the proofing cabinet and are parallel to and laterally spaced from the outer side walls 16 and extend from the top wall 17 of the cabinet to the bottom wall 18. Moreover, an inner bottom wall 20 supported between the inner side walls 19 is spaced above the outer bottom wall 18. Vertical strip members 22 likewise formed of sheet metal are secured to the adjacent vertical rear and front edges of the outer and inner side walls 16 and 19 to define a pair of side gas distributing or plenum chambers, as will be hereinafter described.

A plurality of regularly vertically spaced and horizontally extending pairs of track or tray supporting members 23 which may be formed of angle or L-shaped members are mounted on the inner side members 19, the tracks of each pair being at the same level and serving to slidably support the dough holding trays and constituting a tray rack. It should here be noted that the dough holding trays, particularly in the production of doughnuts, crullers or the like, are formed of open-mesh wire screening supported in heavy wire frameworks. The shape of the tray is rectangular and of dimensions so conforming with the corresponding dimensions of the cabinet as to permit their ready accommodation in the cabinet. Disposed immediately below each pair of track members 23 and mounted between the inner side walls 19, at their front and rear edges, are the duct supporting and reinforcing members 24 which are illustrated as being L-shaped.

The front and rear of the proofing cabinet are closed by a plurality of contiguous vertically spaced doors, each of which may be swung about a horizontal axis to open position, thereby permitting access to the interior of the proofing cabinet both from the rear or front thereof and at any selected level without disturbing the other levels of the cabinet. The doors are of rectangular shape and include a peripheral frame member 27 which supports a transparent panel 26 formed of a suitable plastic or resistant glass thereby permitting visual inspection of the cabinet interior without opening of the doors. Each of the doors are provided with rigidly connected hinge rods 28 which project laterally outwardly from the lower corners of the doors, and are then bent rearwardly and downwardly and support counterweights 29 at their free ends. A pair of door supporting members are mounted at the front and rear of the cabinet adjacent the vertical edges thereof and include vertical transversely projecting strips 30 in which are formed a plurality of sets of slits 32 vertically spaced at distances corresponding to the heights of the doors. The slits 32 are generally horizontal and terminate in a depressed or depending portion. Thus, the doors are hingedly supported, the horizontal portions of the rods 28 normally resting in the depressed portions of slits 32, and are urged to a fully open or closed position by the counterweights 29. Furthermore, the doors may be readily and easily removed for cleaning and maintenance purposes.

Considering now the air circulating and conditioning system, there is formed in each of the inner side members 19 a plurality of horizontal slits or ports 33 which extend for substantially the width of the side members 19 and are positioned directly below each of the track members 23. Thus, there is gaseous communication between the interior of the cabinet and the space between the inner and outer side walls 19 and 16 at each of the levels of the tray supporting tracks 23. The inner and outer side walls 19 and 16 and the sealing end strips 22 define a gas distributing manifold or plenum chamber 34. In order to direct the flow of air along the desired path, a horizontal baffle member 36 is provided in each of the slits 33 which member is fastened to the lower face of the corresponding track member 23 and projects into the interior of the manifold 34. The baffles 36 extend substantially the full width of the slits 33.

The air return or exhaust system includes a plurality of return ducts or conduits 37 which are vertically spaced extending horizontally into the cabinet and positioned directly below each pair of tracks 23. The ducts 37 are T-shaped and of flat rectangular cross section, the cross arm 39 being supported horizontally and transversely by and between opposite lateral members 24 substantially intermediate the side walls of the proofing chamber. A slit or port 40 is formed in the upper wall of each of the cross arms 39 and extends substantially the length of the cross arm thereby providing an exhaust port at each tray supporting level along the full depth thereof. The laterally extending leg portions of the ducts 37 pass through the slits 33 on one side and are connected to and in gaseous communication with a return or exhaust manifold or duct 41 of rectangular cross section which extends vertically to the top of the cabinet and is positioned on the exterior face of the outer side wall 16.

An air circulating device 42 is mounted on the top of the proofing cabinet and may comprise a suitably actuated fan, blower or the like. The inlet or suction side of the air circulating device is connected to the exhaust manifold 41 whereas the outlet or pressure side is connected by way of a horizontal conduit 43 to a vertical duct 44 running along the side of the proofing cabinet to the bottom thereof where it extends horizontally and reversely to communicate with the interior of an air heater housing 46 mounted at the bottom of the proofing cabinet. Air heating units 47 and suitable baffles are positioned in the housing 46, the units 47 preferably being of the electrically energized type such as resistor heating elements. The sides of the housing 46 are open and the housing communicates with the bottom interiors of the manifolds 34.

In order to control the humidity of the air circulating through the proofing chamber, a rectangular opening 48 is formed in the wall of the duct 44 adjacent its lower end. A door or damper 49 is associated with the opening 48 and is driven by a supporting motor 50 between its open and closed position, its open position being achieved by the counterclockwise rotation of the damper 49 about its transverse axis to the position shown in Figure 3, where the upper portion of the vane projects upwardly and inwardly into the duct 44. The operation of the motor is controlled by a control device 51 which responds to the degree of humidity in the upper part of the duct 41. The motor 50 operates to close opening 48 when the humidity conditions are at a preselected level or below and to open the damper 49 when the humidity in the duct 41 is above the preselected level. Means are provided for adjusting the humidity level. Furthermore, there is provided heater regulating means 52 which is responsive to the temperature of the air circulating through the proofing chamber to de-energize the heating elements 47 when the circulating air temperature exceeds a predetermined level and to energize the elements 47 when the temperature falls below the preselected level. This temperature level is likewise adjustable.

In operation the temperature and humidity controls are set at the desired level and the air circulating device is energized. The proofing chamber is then loaded with trays of the dough products to be raised, the trays preferably being of the metal screen type as aforesaid and are inserted into the chamber by opening individual doors and sliding the trays along the accessible tracks. Upon one section being loaded, the corresponding door is closed, another door opened and the respective section loaded until the entire proofing chamber is loaded. It should be pointed out that the chamber is equally as effective whether partially or fully loaded.

The conditioning air is circulated by the fan 42 through the conduit 43, duct 44 and heater housing 46 where the air is raised in temperature and fed into the manifolds 34. The air from the manifolds 34 is directed by the baffles 36 into the interior of the proofing chamber through the ports 33 at each of the tray levels thus exposing the dough to the conditioned air. The air from the proofing chamber is exhausted through the ports 40 by way of the ducts 37 into the exhaust duct or manifold 41. The provision of the inlet and outlet ports at the individual tray levels in accordance with the above arrangement results in the conditioning atmosphere traveling in sequence along a minimum of the products to be proofed before being exhausted while circulating along all the products. As a consequence, the dough products in all parts of the proofing chamber are subjected to substantially identical ambient humidity and temperature conditions. The air from the exhaust duct is led to the suction end of the fan 42 where it is recirculated.

The air as it is circulated over the dough products picks up moisture which must be disposed of to maintain the air at the desired humidity. This is done continuously by the humidity control device 50 which opens the damper 49 in response to the humidity control element 51 which actuates the device 50 to open the damper 49 when the humidity in the duct 41 exceeds the preselected level. In the damper open position some of the air is released from the duct 44 to the outside and fresh air is sucked in and admixed with the circulating air. When the circulated air drops to below the desired humidity level, the humidity control device 50 is again automatically actuated to cause the damper 49 to close the opening 48 thereby maintaining or increasing the humidity level. The temperature of the circulated air is also controlled by energizing and de-energizing the heater elements 47 in response to the temperature of the circulated air as aforesaid.

While there has been described a preferred embodiment of the present invention, it is obvious that numerous omissions and alterations may be made without departing from the spirit thereof.

We claim:

1. A proofing apparatus of the character described comprising a cabinet having a top wall and a bottom wall, laterally spaced apart inner and outer side walls, and strips joining the adjacent edges of said side walls to define a cavity between each pair of inner and outer side walls, each of said inner side walls having a plurality of regularly vertically spaced horizontal slits formed therein, a vertical exhaust manifold, a plurality of vertically spaced ducts connected to said manifold and projecting into the interior of said cabinet, said ducts having ports formed therein substantially intermediate said side walls, and air circulating means having its outlet and inlet connected to said cavities and manifold respectively.

2. A proofing apparatus of the character described comprising a cabinet having a top wall and a bottom wall, laterally spaced apart inner and outer side walls, and strips joining the adjacent edges of said side walls to define a cavity between each pair of inner and outer side walls, each of said inner side walls having a plurality of regularly vertically spaced horizontal slits formed therein, a vertical exhaust manifold, a plurality of vertically spaced ducts connected to said manifold and extending horizontally and laterally into the interior of said cabinet, a plurality of vertically spaced horizontal transverse ducts communicating with the laterally extending duct components and having transverse slits formed therein extending for substantially the depth of said cabinet and substantially intermediate said inner side walls, and air circulating means having an outlet and inlet connected to said cavities and said exhaust manifold respectively.

3. A proofing apparatus of the character described comprising a cabinet having a top wall and a bottom wall, laterally spaced apart inner and outer side walls, and strips joining the adjacent edges of said side walls to define a cavity between each pair of inner and outer side walls, each of said inner side walls having a plurality of regularly vertically spaced horizontal slits formed therein, a plurality of pairs of transversely extending track members mounted on the inner face of said inner side walls to define a tray rack, a vertical exhaust manifold positioned externally to said cabinet, a plurality of vertically spaced ducts connected to said manifold and extending horizontally and laterally into the interior of said cabinet, a plurality of vertically spaced horizontal transverse ducts communicating with the laterally extending duct components and having transverse slits formed therein extending for substantially the depth of said cabinet and substantially intermediate said inner side walls, and air circulating means having an outlet and inlet connected to said cavities and said exhaust manifold respectively.

4. A proofing apparatus as claimed in claim 3, wherein said ducts are substantially flat and there are provided vertically spaced laterally extending duct support members which are mounted between said side walls proximate the front and back of said cabinet.

5. A proofing apparatus of the character described comprising a cabinet having a top wall and bottom wall, laterally spaced inner and outer side walls, and strips extending between the adjacent edges of said side walls to define a cavity between each pair of inner and outer side walls, a rear wall and a front wall formed of a plurality of vertically spaced contiguous doors pivotally mounted between said side walls for rotation about horizontal lateral axes, said inner side walls having regularly spaced horizontal transversely extending slits formed therein, a plurality of regularly vertically spaced transversely extending tracks mounted on the respective inner faces of said inner side walls to define a tray rack, a vertical exhaust manifold positioned along an outer side wall, a plurality of vertically spaced ducts connected to said manifold and extending horizontally and laterally into the interior of said cabinet, a plurality of vertically spaced horizontal transverse ducts communicating with said laterally extending duct components and having transverse slits formed therein extending for substantially the depth of said cabinet and substantially intermediate said inner side walls, and air circulating means having an outlet and inlet connected to said cavities and said exhaust manifold respectively.

6. A proofing apparatus as claimed in claim 5, wherein air heating means are disposed between said air circulating means outlet and said cavities.

7. A proofing apparatus as claimed in claim 5, including a duct connecting the air circulating means outlet and said cavities, said duct having an opening formed therein, a damper rotatably mounted in said opening and movable between opened and closed positions to permit the admission of fresh air into the duct, and means responsive to humidity of the air circulating through said cabinet for automatically controlling the position of said damper.

8. A proofing apparatus as claimed in claim 5, including baffles positioned along the upper edges of the slits formed in the inner side walls and projecting into said side wall cavities.

9. A proofing apparatus as in claim 2, wherein the ducts are generally T-shaped in plan, with the heads thereof extending substantially the depth of the cabinet and each thereof having the transverse slit in the top thereof substantially coextensive in length with said head, and parallel to the horizontal slits in the inner side walls.

HERBERT T. HUNTER.
BEN W. WILSON.

References Cited in the file of this patent

UNITED STATES PATENTS

| Number | Name | Date |
|---|---|---|
| 1,137,752 | Goldstein | May 4 1915 |
| 1,507,719 | Ritchie | Sept. 9, 1924 |
| 1,511,961 | Halary | Oct. 14, 1924 |
| 1,519,288 | Woodson | Dec. 16, 1924 |
| 1,555,321 | Woodson | Sept. 29, 1925 |
| 1,564,783 | Harris | Dec. 8, 1925 |
| 1,587,041 | Secord | June 1, 1926 |
| 1,807,688 | Debus | June 2, 1931 |
| 1,831,478 | Bressler | Nov. 10, 1931 |
| 1,901,509 | Hall | Mar. 14, 1933 |
| 2,499,525 | Person | Mar. 7, 1950 |
| 2,511,328 | Cline | June 13, 1950 |

FOREIGN PATENTS

| Number | Country | Date |
|---|---|---|
| 457,766 | Great Britain | Nov. 27, 1936 |